(12) United States Patent
Lee

(10) Patent No.: US 12,475,817 B2
(45) Date of Patent: Nov. 18, 2025

(54) SYSTEM AND METHOD FOR CONTROL OF TUNNEL REGION OF AUGMENTED REALITY HUD

(71) Applicant: HYUNDAI MOBIS CO., LTD., Seoul (KR)

(72) Inventor: Jae Young Lee, Icheon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 144 days.

(21) Appl. No.: 18/392,949

(22) Filed: Dec. 21, 2023

(65) Prior Publication Data

US 2024/0395178 A1 Nov. 28, 2024

(30) Foreign Application Priority Data

May 25, 2023 (KR) ........................ 10-2023-0067357

(51) Int. Cl.
| | | |
|---|---|---|
| G09G 3/00 | (2006.01) | |
| G06T 5/20 | (2006.01) | |
| G06T 7/11 | (2017.01) | |
| G06T 11/00 | (2006.01) | |

(52) U.S. Cl.
CPC .............. G09G 3/001 (2013.01); G06T 5/20 (2013.01); G06T 7/11 (2017.01); G06T 11/001 (2013.01); *G09G 2320/0233* (2013.01); *G09G 2320/0666* (2013.01); *G09G 2320/068* (2013.01); *G09G 2354/00* (2013.01)

(58) Field of Classification Search
CPC ........... G09G 3/001; G09G 2320/0233; G09G 2320/0666; G09G 2320/068; G09G 2354/00; G06F 3/011; G06F 3/012; G06F 3/013; G06T 5/20; G06T 7/11; G06T 11/001; G06T 2207/10024; G06T 5/94; G06T 5/92; G06T 19/006; H04N 9/3182; H04N 9/67; H04N 13/332; B60K 35/00; B60K 35/23; G02B 27/0101; G02B 2027/014

See application file for complete search history.

(56) References Cited

U.S. PATENT DOCUMENTS

| | | | |
|---|---|---|---|
| 8,164,543 B2* | 4/2012 | Seder ...................... | G06T 7/246 340/461 |
| 8,521,411 B2* | 8/2013 | Grabowski ........ | G02B 27/0101 701/454 |
| 8,704,653 B2* | 4/2014 | Seder ................... | G01C 21/365 340/436 |
| 10,914,955 B2* | 2/2021 | Lafon ................ | G02B 27/0172 |
| 2019/0250408 A1* | 8/2019 | Lafon .................. | G02B 27/017 |
| 2023/0161084 A1* | 5/2023 | Chistikov .............. | G02B 27/48 359/599 |

FOREIGN PATENT DOCUMENTS

KR 101979569 B1 5/2019

\* cited by examiner

*Primary Examiner* — Vijay Shankar
(74) *Attorney, Agent, or Firm* — Novo TechIP International PLLC

(57) ABSTRACT

The present invention relates to a system and method for controlling a brightness of a tunnel region of an augmented reality HUD capable of minimizing a change in brightness felt by the driver due to a tunnel region by correcting the brightness of a dark region inside the tunnel to approximate the brightness of an external driving environment and providing the corrected image as image data for the augmented reality HUD.

9 Claims, 2 Drawing Sheets

SYSTEM AND METHOD FOR CONTROL OF TUNNEL REGION OF AUGMENTED REALITY HUD

CROSS-REFERENCE TO RELATED APPLICATIONS

The present application claims priority to Korean Patent Application No. 10-2023-0067357, filed May 25,2023, the entire contents of which is incorporated herein for all purposes by this reference.

TECHNICAL FIELD

The present invention relates to a system and method for controlling a brightness of a tunnel region of an augmented reality head-up display (HUD). More specifically, the present invention relates to a system and method for controlling a brightness of a tunnel region of an augmented reality HUD that corrects the brightness of image data so that the brightness of a dark region inside a tunnel is close to the brightness of an external environment before entering the tunnel, in order to minimize the driver's dark adaptation phenomenon that occurs when entering the tunnel while driving.

BACKGROUND

Tunnels, which are one of the road structures that drivers may encounter while driving, are narrow and dark compared to the surrounding road environment, so when an accident occurs, tunnels can lead to two or more accidents, and the fatality rate of accidents is high because evacuation regions within the tunnel are limited.

Tunnels not only have the above-mentioned problems, but when a driver enters a dark tunnel while driving on a relatively bright road, dark adaptation occurs, in which the driver's vision is temporarily lost, making it difficult to clearly identify the situation ahead for a while. Because of this, the driver instinctively reduces the speed of the vehicle being driven.

For this reason, the traffic capacity inside the tunnel decreases, so if more vehicles than the tunnel's traffic capacity are driven on the road connected to the tunnel, traffic congestion inevitably occurs.

Ultimately, tunnel sections with high traffic become habitually congested sections, causing energy waste and environmental pollution, and shortening the lifespan of vehicles.

Nevertheless, in Korea, 70% of the country consists of mountains and hilly regions, so the existence of such tunnels is inevitable in order to safely design roads, including highways.

Accordingly, the present invention is to solve the above problem by recognizing the tunnel region, especially the inner region of the tunnel when providing image data through an augmented reality HUD and enhancing the brightness value of the corresponding region so that changes in the driver's field of vision are minimized in the tunnel section.

In this regard, Korean Registered Patent Publication No. 10-1979569 ("apparatus and method for correcting external image of HUD system") proposes a technology of analyzing and correcting the brightness, etc. of the external image input to the HUD system and displaying HDD image based on the corrected image.

SUMMARY

The present invention is devised to solve the above problems, and provides a system and method for controlling a brightness of a tunnel region of an augmented reality HUD capable of minimizing a change in brightness felt by the driver due to a tunnel region by correcting the brightness of a dark region inside the tunnel to approximate the brightness of an external driving environment and providing the corrected image as image data for the augmented reality HUD.

In order to solve the above problems, a system for controlling a brightness of a tunnel region of an augmented reality HUD preferably comprises a basic input unit that receives front image data obtained from a vehicle to which an augmented reality HUD is applied and sensing condition information based on the front image data from a sensing device that acquires the front image data, an image analysis unit that receives the front image data from the basic input unit using a stored segmentation network, segments each pixel constituting each frame, and classifies the segmented pixel into a unit of object, a light density analysis unit that calculates light density for each object by the image analysis unit using the sensing condition information by the basic input unit, and an output image generation unit that applies a correction value of the light density for a pixel corresponding to an inside of a tunnel region in the object classified by the image analysis unit, among the front image data by the basic input unit, based on the light density calculated by the light density analysis unit, and generates output image data in which the light density inside the tunnel is corrected, wherein the output image data is displayed on an windshield of the vehicle through an augmented reality HUD projector.

Further, the image analysis unit preferably comprises a first image analyzer that segments an individual object region included in the front image data into a unit of pixel using the stored segmentation network, and a second image analyzer that divides objects included in the front image data into an outside and inside of the tunnel region and segments the divided objects in the unit of pixel using the stored segmentation network.

Further, the light density analysis unit preferably comprises a converter that receives the front image data from the basic input unit and converts an RGB value of each pixel into an HSV (Hue, Saturation, Value) value for each frame, a pixel calculator that calculates the light density of each pixel for each frame using the sensing condition information from the basic input unit and the V value from the converter, an average calculator that calculates an average light density of a pixel positioned outside the tunnel region and an average light density of a pixel positioned inside the tunnel region for each individual object, by using a segmentation result by the first image analyzer, a segmentation result by the second image analyzer, and a light density calculation value for each pixel by the pixel calculator, and a correction value calculator that calculates a light density correction value for each pixel constituting each individual object by using the segmentation result by the first image analyzer, the segmentation result by the second image analyzer, and the average light density calculation value by the average calculator.

Further, the light density analysis unit preferably further comprises a determinator that determines whether all pixels constituting each individual object are positioned only inside or outside the tunnel region, using the segmentation result by the first image analyzer and the segmentation result by the second image analyzer; and an extractor that extracts a calculated average light density value of the pixel positioned outside the tunnel region for a specific individual object that is stored according to an analysis result of a previous frame according to a determination result of the determinator, in case where all pixels constituting the specific individual object are positioned only inside the tunnel region. The correction value calculator preferably calculates the light density correction value of each pixel for each individual object by using the segmentation result by the first image analyzer, the segmentation result by the second image analyzer, the average light density calculation value by the average calculator, and the average light density calculation value extracted by the extractor.

The output image generation unit preferably comprises a light density corrector that applies the light density correction value by the correction value calculator only for each pixel positioned inside the tunnel region, among all pixels constituting each frame of the front image data, by using the segmentation result by the first image analyzer and the segmentation result by the second image analyzer, a brightness calculator that calculates a corrected brightness value for each pixel by obtaining a difference between a current light density calculation value calculated by the pixel calculator and the light density calculation value to which the light density correction value has been applied by the light density corrector for each pixel constituting each frame of the front image data, and an image generator that generates the output image data with brightness enhanced for each frame of the front image data by converting to the RGB value by using H and S values for each pixel by the converter and the corrected brightness value by the brightness calculator.

In order to solve the above problems, a method for controlling a brightness of a tunnel region of an augmented reality head-up display (HUD) using a system for controlling the brightness of the tunnel region of the augmented reality HUD in which each step is performed by an operation processing device, preferably comprises a first input step of receiving front image data obtained from a vehicle equipped with an augmented reality HUD, a second input step of receiving, from the vehicle, sensing condition information of a sensing device that acquires the front image data in the first input step, a first image analysis step of receiving the front image data in the first input step using a stored segmentation network, and analyzing each pixel constituting each frame to segment an individual object region included into a unit of pixel, a second image analysis step of receiving the front image data in the first input step using the stored segmentation network, and analyzing each pixel constituting each frame to divide an outside and inside of the tunnel region in objects included and segment the divided region in the unit of pixel, a light density analysis step of calculating light density for each pixel in the first image analysis step and the second image analysis step using the sensing condition information in the second input step, and an output image generation step of applying a correction value of the light density for a pixel corresponding to the inside of the tunnel region in the second image analysis step, among the front image data in the first input step, based on the light density calculated in the light density analysis step, and generating output image data in which the light density inside the tunnel is corrected, wherein the output image data in the output image generation step is displayed on an windshield of the vehicle to which the augmented reality HUD is applied through an augmented reality HUD projector.

Further, the light density analysis step preferably comprises a conversion step of receiving the front image data from the first input step and converting an RGB value of each pixel into an HSV (Hue, Saturation, Value) value for each frame, a pixel calculation step of calculating the light density of each pixel for each frame using the sensing condition information in the second input step and the V value in the conversion step, an average calculation step of calculating an average light density of a pixel positioned outside the tunnel region and an average light density of a pixel positioned inside the tunnel region for each individual object, by using a segmentation result in the first image analysis step, a segmentation result in the second image analysis step, and a light density calculation value for each pixel in the pixel calculation step, and a correction value calculation step of calculating a light density correction value for each pixel constituting each individual object by using the segmentation result in the first image analysis step, the segmentation result in the second image analysis step, and the average light density calculation value in the average calculation step.

Further, the light density analysis step preferably further comprises a determination step of determining whether all pixels constituting each individual object are positioned only inside or outside the tunnel region, using the segmentation result in the first image analysis step and the segmentation result in the second image analysis step; and an extraction step of extracting a calculated average light density value of the pixel positioned outside the tunnel region for a specific individual object that is stored according to an analysis result of a previous frame according to a determination result in the determination step, in case where all pixels constituting the specific individual object are positioned only inside the tunnel region. In the correction value calculation step, the light density correction value of each pixel for each individual object is preferably calculated by using the segmentation result in the first image analysis step, the segmentation result in the second image analysis step, the average light density calculation value in the average calculation step, and the average light density calculation value extracted in the extraction step.

Further, the output image generation unit preferably comprises a light density correction step of applying the light density correction value in the correction value calculation step only for each pixel positioned inside the tunnel region, among all pixels constituting each frame of the front image data, by using the segmentation result in the first image analysis step and the segmentation result in the second image analysis step, a brightness calculation step of calculating a corrected brightness value for each pixel by obtaining a difference between a current light density calculation value calculated in the pixel calculation step and the light density calculation value to which the light density correction value has been applied in the light density correction step for each pixel constituting each frame of the front image data, and an image generation step of generating the output image data with brightness enhanced for each frame of the front image data by converting to the RGB value by using H and S values for each pixel in the conversion step and the corrected brightness value in the brightness calculation step.

DETAILED DESCRIPTION

Figure 1:
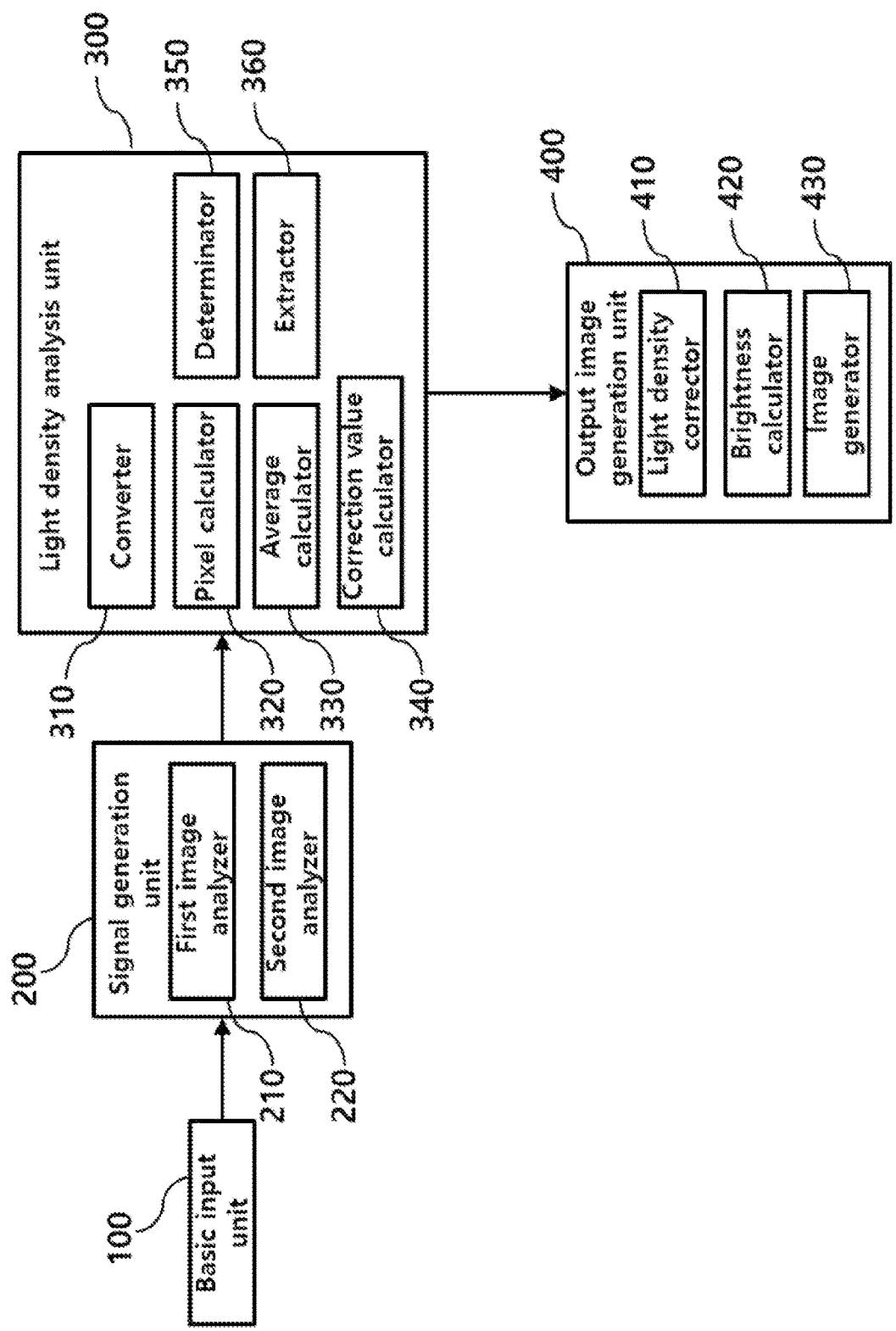
FIG. 1 is an exemplary configuration diagram illustrating a system for controlling a brightness of a tunnel region of an augmented reality HUD according to an embodiment of the present invention.

The aforementioned objects, features, and advantages of the present disclosure will be clearer through the following exemplary embodiment associated with the accompanying drawings. The following specific structure or functional explanations are illustrated to describe exemplary embodiments in accordance with the concept of the present disclosure. The exemplary embodiments in accordance with the concept of the present disclosure may be embodied in various forms but are not interpreted to be limited to the exemplary embodiments described in this specification or application. Various modifications and changes may be applied to the exemplary embodiments in accordance with the concept of the present disclosure and the exemplary embodiments may have various forms so that the exemplary embodiments will be described in detail in the specification or the application with reference to the drawings. However, this does not limit the present disclosure within specific exemplary embodiments, and it should be understood that the present disclosure covers all the modifications, equivalents and replacements within the spirit and technical scope of the present disclosure. Terms such as first or second may be used to describe various components but the components are not limited by the above terminologies. The above terminologies are used to distinguish one component from the other component, for example, a first component may be referred to as a second component without departing from a scope in accordance with the concept of the present disclosure and similarly, a second component may be referred to as a first component. It should be understood that, when it is described that an element is "coupled" or "connected" to another element, the clement may be directly coupled or directly connected to the other element or coupled or connected to the other element through a third element. On the contrary, it should be understood that when an element is referred to as being "directly connected to" or "directly coupled to" another element, another element does not intervene therebetween. Other expressions to describe the relationship between elements, that is, expressions such as "between", "immediately between", "adjacent to", or "directly adjacent to" need to be also similarly interpreted. Terms used in the present specification are used only to describe specific exemplary embodiments, and are not intended to limit the present disclosure. A singular form may include a plural form if there is no clearly opposite meaning in the context. In this specification, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance. If it is not contrarily defined, all terms used herein including technological or scientific terms have the same meaning as those generally understood by a person with ordinary skill in the art. Terms which are defined in a generally used dictionary should be interpreted to have the same meaning as the meaning in the context of the related art but are not interpreted as an ideally or excessively formal meaning if it is not clearly defined in this specification. Hereinafter, an exemplary embodiment of the present disclosure will be described in more detail with reference to the accompanying drawings. Further, the same reference numerals in the drawings denote the same members.

In addition, the system means a set of components including apparatuses, mechanisms, units, etc. which are organized and regularly interact with each other to perform required functions.

First, an augmented reality HUD is described. A head up display (HUD) is a front display device designed to display driving information of a vehicle on a front glass of a vehicle.

That is, the HUD device forms and displays a virtual image to display various driving guidance information such as a speed, a fuel level, temperature, and a warning direction on a cluster of the vehicle. As technology advances, HUDs that apply augmented reality technology are emerging.

Augmented reality technology refers to technology that adds (augments) virtual information based on the real world. Unlike virtual reality (VR), which makes images, surrounding backgrounds, objects, etc. all virtual, augmented reality makes only the added information virtual, greatly increasing immersion.

When this augmented reality technology is applied to a vehicle's head up display (HUD), unlike the existing HUD, a virtual image is transmitted over the entire front windshield on the actual road according to the driver's gaze angle.

That is, the various driving guidance information described above is matched with a front road in real time and projected onto the front windshield.

In order to implement such an augmented reality HUD, technology is required to recognize the position of the driver's eyes and driving information position in real time.

Even when displaying GPS-based information such as a driving route in 3D, lane recognition is required, and vehicle recognition is also required before indicating the distance to a front vehicle.

In addition, accurate matching is achieved only when the virtual image is projected onto the coordinates where the straight line connecting environmental information position and the driver's eye coordinates and the windshield meet, so that the virtual image is clearly displayed to the driver.

This augmented reality HUD has the advantage of higher transmission than that of a regular HUD because it displays various driving guidance information provided according to the driver's gaze angle.

When driving on the road, drivers inevitably encounter tunnels. In particular, in countries like Korea where 70% of the country consists of mountainous and hilly regions, situations where a vehicle enters a tunnel while driving may occur.

Due the structure of the human eye, if the vehicle is in a bright place while driving and then suddenly enters a dark place, dark adaptation occurs in the driver. To explain this in terms of the road, if a vehicle is driving on a relatively bright road and suddenly enters a dark tunnel, dark adaptation occurs where the driver's vision is not clear for a while, and the driver instinctively slows down the vehicle. If the driver ignores this and maintains the vehicle's speed, the likelihood of an accident will inevitably increase because the driver will have difficulty understanding the situation ahead.

Therefore, an accident in a tunnel is highly likely to lead to two or more major accidents, and because the evacuation region is limited due to the nature of the tunnel structure, there is also a problem with the high fatality rate due to accidents.

Accordingly, in order to solve the above problems, a system and method for controlling a brightness of a tunnel region of an augmented reality HUD according to an embodiment of the present invention uses an augmented reality HUD as it is impossible to solve dark adaption due to the structure of the human eye, and provides an output image (virtual image) so that a dark region inside a tunnel has relatively similar brightness to that of a bright region outside the tunnel, thereby minimizing changes in the driver's field of vision due to entering the tunnel.

In addition, in case where a system and method for controlling a brightness of a tunnel region of an augmented reality HUD according to an embodiment of the present invention are legislated to be compulsorily installed in vehicles, even if the number of lights inside the tunnel that are always on is reduced or the brightness of the lights is reduced, the driver does not feel discomfort due to the dark region inside the tunnel, or the discomfort is less. Therefore, there is an advantage of achieve energy saving effects.

Briefly, a system and method for controlling a brightness of a tunnel region of an augmented reality HUD according to an embodiment of the present invention will be described. By applying a pre-stored segmentation network (e.g., a panoptic segmentation network, etc.), each object including front camera image data is segmented into pixels, and the pixels are divided into the pixels positioned inside the tunnel and the pixels positioned outside the tunnel.

After converting the RGB values of the front camera image data into HSV (Hue, Saturation, Value (brightness)) values, the V value (brightness value) is compared with the brightness value (light density) of the actual external environment, and the brightness value of the pixel positioned in the region inside the tunnel is corrected to correspond to the brightness value of the actual external environment to produce output image data through the augmented reality HUD.

In this case, if the same object exists both inside and outside the tunnel (e.g., a road, etc.), a correction value is calculated so that the pixels corresponding to the region inside the tunnel have the brightness value of the pixels corresponding to the region outside the tunnel.

In addition, in the case of a vehicle positioned far ahead, the object itself may exist only inside the tunnel, so in this case, the correction value is calculated so that the corresponding object analyzed in a previous frame has a brightness value when the corresponding object exists outside the tunnel.

Through this, due to the image data displayed on the entire front windshield according to the driver's gaze angle, the dark regions inside the tunnel are also corrected and output to become bright, so the driver can minimize the occurrence of dark adaptation due to differences in brightness, making it possible to avoid the problems caused by entering the tunnel.

FIG. 1 is an exemplary configuration diagram illustrating a system for controlling a brightness of a tunnel region of an augmented reality HUD according to an embodiment of the present invention.

As illustrated in FIG. 1, a system for controlling a brightness of a tunnel region of an augmented reality HUD according to an embodiment of the present invention may comprise a basic input unit 100, an image analysis unit 200, a light density analysis unit, and an output image generation unit 400. Preferably, each component performs operations in an operation processing unit such as an ECU including a computer that performs transmission and reception through a communication channel within the vehicle.

Each component will be described in detail, The basic input unit 100 preferably receives front image data acquires from a vehicle to which an augmented reality HUD is applied and sensing condition information by the front image data from a sensing device (for example, a front camera, etc.) that acquires the front image data.

In this case, as described above, the front image data is the front image data of the driving vehicle that is input to the augmented reality HUD to match various driving guidance information on the actual road.

Since a typical camera has the function of automatically adjusting the exposure time and aperture area, the aperture area and exposure time change for each frame to provide optimal images. Therefore, when only the front image data is analyzed, the brightness value of the front image data is different from the brightness value of the actual external environment, or more specifically, the brightness value that the driver actually feels, which makes it impossible to extract the exact amount of light for each pixel constituting the front image data.

For example, when shooting an image in night mode, the captured result is output relatively brightly, even in an environment where there is virtually no light to the human eye.

In order to solve the problem that the actual external light is distorted and appears brighter due to the basic function of the camera, the basic input unit 100 receives the front image data together with the sensing condition information when acquiring the front image data, from the sensing device that acquires the front image data, thereby estimating the illuminance value through the light density analysis unit 300.

Specifically, the front camera that acquires the front image data for the augmented reality HUD is mounted to face the same direction as the driver's gaze, and naturally the brightness detected by the driver and the brightness detected by the front camera are the same.

The amount of light received by a specific pixel can be expressed as the product of the light density reaching the pixel and the area irradiated by the aperture to the pixel.

Assuming that the light passing through the aperture reaches all pixels equally, the size of the analog signal output from each pixel can be defined as shown in Equation 1 below.

Size of analog signal of camera pixel=light density (cd/m2)×aperture area/number of pixels×quantum efficiency×exposure time [Equation 1]

Here, the quantum efficiency is the conversion rate of photons into electrons, and is a constant value depending on the material or structure and has a fixed value.

In addition, the received analog signal increases in size when it passes through an analog amplifier, is converted to a digital signal, and then is digitally amplified through each signal processing step.

Accordingly, the brightness value of one pixel among all pixels constituting the image frame can be defined as in Equation 2 below.

Brightness of one pixel=size of analog signal of camera pixel×analog amplification rate×digital amplification rate [Equation 2]

Based on this, the basic input unit 100 preferably receives the aperture area and exposure time as sensing condition information in advance in order to estimate the illuminance value through the light density analysis unit 300.

A general image sensing device provide a protocol to transmit separate embedded data to assist in correcting information such as brightness and color of raw images in an image processing device. Using this, the basic input unit 100 is set to receive the aperture set value, exposure time, analog amplification rate, and digital amplification rate used to obtain the raw image through the embedded data area in the sensing device that acquires the front image data. The light density estimation through this will be described in detail later.

The image analysis unit 200 receives the front image data from the basic input unit 100 using a stored segmentation network, segments each pixel for each frame, and classifies the segmented pixels in the units of objects.

In this case, a panoptic segmentation network is used as the stored segmentation network, but this is only an embodiment of the present invention and the present invention is not necessarily limited thereto.

As illustrated in FIG. 1, the image analysis unit 200 includes a first image analyzer 210 and a second image analyzer 220.

The first image analyzer 210 preferably segments individual object areas included in the front image data in the units of pixels using the stored segmentation network.

The first image analyzer 210 corresponds to the operation of a typical panoptic segmentation network.

In other words, in the panoptic segmentation network, objects that need to be divided on an object basis, that is, objects such as vehicles and people, for example, are divided into individual units in consideration of the driving environment. However, objects such as sky, tunnel, road, ground, etc. are mapped to the same object as in semantic segmentation.

In other words, when analyzing the front image data of a driving vehicle using the panoptic segmentation network, objects such as vehicle 1, vehicle 2, person 1, and person 2 are divided and segmented into individual objects. Objects such as the sky and roads are segmented into one sky object, not into sky 1 and sky 2, even if the sky is divided by large clouds.

This is because a typical panoptic segmentation network has a structure in which a sematic encoder-decoder structure and an instance encoder-decoder structure are combined, so the first image analyzer 210 divides and segments only objects that require individual unit division into individual units, and segments objects that do not require individual unit division into one unit.

The second image analyzer 220 preferably divides the outside and inside of the tunnel region in the objects included in the front image data and segments them in the units of pixels, using the stored segmentation network.

As described above, in the case of a typical panoptic segmentation network, like the first image analyzer 210, the tunnel is segmented into one object.

However, in reality, if the tunnel region is segmented, the outer structure of the tunnel itself is positioned in a region where sunlight exists, and the region inside the tunnel appears bright due to artificial lighting because sunlight does not reach the region. However, since it is realistically impossible to attach artificial lighting to all regions of the tunnel, the inside region is inevitably darker than the outside region.

Using this difference, the second image analyzer 220 preferably divides and segments the outer and inner regions of the tunnel region (tunnel object) on a pixel basis, among the objects included in the front image data.

In this case, the tunnel region itself may be analyzed using the analysis result of the first image analyzer 210, or may be segmented and analyzed separately.

However, the second image analyzer 220 preferably adds a tunnel prediction head layer that receives output through a semantic decoder in addition to the panoptic segmentation network.

Through this, learning processing is performed to classify whether the corresponding pixel exists in the region inside the tunnel.

In detail, it is desirable that the tunnel prediction layer divides pixels (pixels whose brightness values differ by more than a predetermined value. In this case, it is desirable to set a predetermined value by calculating the actual difference in brightness between the outside and inside regions of the tunnel.) within the tunnel from the image data and outputs a tunnel mask.

This is learned by giving a fixed weight to the pixels corresponding to the tunnel region in the image data including the tunnel region, and whether the tunnel is inside/outside is estimated by using the output of the sematic decoder.

In addition, by using the mask labeled with the tunnel region as a ground truth (GT), a loss value (e.g., Binary Cross Loss) is obtained, and then, a repetitive learning is performed using a stochastic gradient descent (SGD) method so that the loss value is minimized.

Through this, the front image data is image data taken before entering the tunnel, and if there is a tunnel ahead, the image analysis unit 200 may determine and segment the front image data into the pixels of the inside region and outside region of the tunnel. If the image data is the image data taken after entering the tunnel, all pixels of the front image data are obviously determined and segmented to be pixels of the inside region of the tunnel.

In addition, even if there is artificial lighting inside the tunnel, since the artificial lighting is clearly different from solar energy, the inside region of the tunnel may be determining using such difference.

The light density analysis unit 300 preferably calculates the light density for each object by the image analysis unit 200 using the sensing condition information by the basic input unit 100.

In this case, the light density analysis unit 300 includes a converter 310, a pixel calculator 320, an average calculator 330, and a correction value calculator 340, as illustrated in FIG. 1.

The converter 310 preferably receives the front image data from the basic input unit 100 and converts the RGB values of each pixel into HSV (Hue, Saturation, Value) values for each frame. This is a common technology, and detailed description thereof will be omitted.

The pixel calculation unit 320 preferably calculates the light density of each pixel for each frame using the sensing condition information from the basic input unit 100 and the V value for each pixel from the converter 310.

That is, based on Equations 1 and 2 above, the light density in the direction of the corresponding pixel may be estimated from the brightness value of each pixel through Equation 3 below.

$$\text{Light density (cd/m2) of a specific pixel} = \text{brightness of one pixel} \times \text{number of pixels}/(\text{aperture area} \times \text{quantum efficiency} \times \text{analog amplification rate} \times \text{digital amplification rate} \times \text{exposure time})$$ [Equation 3]

The average calculator 330 preferably calculates the average light density of pixels positioned outside the tunnel region and the average light density of pixels positioned inside the tunnel region for each individual object by using the segmentation result by the first image analyzer 210, the segmentation result by the second image analyzer 220, and the calculated light density for each pixel by the pixel calculator 320.

That is, using the segmentation result by the second image analyzer 220, the tunnel region classified as one object is divided into a darker inner region and a brighter outer region.

Using the classification, for each individual object (e.g., vehicle 1, vehicle 2, road, person 1, etc.), which is the segmentation result by the first image analyzer 210, pixels are divided into pixels positioned outside the tunnel region and pixels positioned inside the tunnel region.

For example, when using the segmentation result by the first image analyzer 210 and the segmentation result by the second image analyzer 220, in the case of a road, if the vehicle that acquires the front image data has not entered the tunnel and there is a tunnel ahead, the object is going to be analyzed from the outside to the inside of the tunnel region obviously.

In addition, in the case of vehicle 1, if the vehicle acquires the front image data at the moment of entering the tunnel, some regions may be analyzed as if the vehicle has entered the tunnel.

Based on this, by applying the calculated light density for each pixel by the pixel calculator 320, the average light density for each individual object is calculated through the calculated light density values of the corresponding pixels.

If Vehicle 2 exists only outside the tunnel, it is apparent that the average light density of Vehicle 2 is calculated using all pixels positioned outside the tunnel region (all pixels constituting the objects of Vehicle 2).

In consideration of the above matters, the average calculator 330 calculates each average light density based on the outside/inside of the tunnel region because correction can be naturally performed only when each individual object has the same brightness inside the tunnel as outside the tunnel.

In summary, the average calculator 330 does not necessarily analyze only objects that exist simultaneously inside and outside the tunnel region, but also calculates the average light density of pixels positioned outside the tunnel region and the average light density of pixels positioned inside the tunnel region for each individual object through the front image data, with respect to all individual objects.

Depending on the current position of each object, a specific object may exist only outside the tunnel region or only inside the tunnel region, and in this case, only the average light density for the corresponding position is calculated.

In this case, if all the pixels of the object are outside the tunnel region, no additional correction for the brightness value is needed, but if all the pixels of the object are inside the tunnel region, only the average light density of the pixels positioned inside the tunnel region is calculated. Therefore, comparison between the internal brightness and the external brightness values is impossible.

In order to solve this problem, the light density analysis unit 300 further includes a determinator 350 and an extractor 360, as illustrated in FIG. 1.

The determinator 350 uses the segmentation result by the first image analyzer 210 and the segmentation result by the second image analyzer 220 to determine whether all pixels constituting each individual object are positioned only inside or outside the tunnel region.

Through this, all pixels that do not necessarily require correction for brightness values can be distinguished from the objects that exist outside the tunnel region, thereby reducing the amount of computation.

According to the determination result of the determinator 350, in case where all pixels of an object are positioned inside of the tunnel region, that is, in case where all pixels constituting a specific individual object are positioned only inside the tunnel region, the extractor 360 preferably extracts the average light density of the pixels positioned outside the tunnel region that is stored based on the analysis results of a previous frame because the light density of the corresponding object outside the tunnel region is unknown.

To do this, in the present invention, the average calculator 330 preferably stores the average light density of pixels positioned outside the tunnel region and average light density of pixels positioned inside the tunnel region of each calculated individual object for each frame.

In this case, it is most preferable to perform individual analysis on all frames constituting the front image data, but in reality, problems such as calculation amount and storage capacity may occur. Thus, considering the speed of the vehicle at which the front image data is acquired or the specifications of the sensing device for acquiring the front image data, it is preferable to perform analysis at regular intervals and store the analysis in a separate storage device.

In addition, because, due to driving conditions, there is a high possibility that there will be no situation in which an engine is started inside a tunnel and the first forward image data is input, the extractor 360 may extract the stored calculated average light density of pixels positioned outside the tunnel region for the corresponding specific individual object, by using the analysis result of the previous frame.

The correction value calculator 340 preferably calculates the light density correction value for each pixel constituting each individual object, by using the segmentation result by the first image analyzer 210, the segmentation result by the second image analyzer 220, and the average light density calculation value by the average calculator 330.

Alternatively, the correction value calculation unit 340 preferably calculates the light density correction value for each pixel constituting each individual object by using the segmentation result by the first image analyzer 210, the segmentation result by the second image analyzer 220, the average light density calculation value by the average calculation unit 330, and the calculated average light density value extracted by the extractor 360.

In detail, in case where all pixels constituting each individual object are not positioned only inside or outside the tunnel region, but are included both inside and outside the tunnel region, according to the determination result of the determinator 350, this is the situation where the correction of the brightness value of the pixel in the dark tunnel is required using the segmentation result by the first image analyzer 210 and the segmentation result by the second image analyzer 220.

Therefore, in case of each individual object whose all pixels are included both inside and outside the tunnel region, the correction value calculator 340 preferably calculates the light density correction value by using the segmentation result by the first image analyzer 210 and the segmentation result by the second image analyzer 220, and the average light density value calculated by the average calculator 330.

The light density correction value is calculated for each corresponding object and is defined as in Equation 4 below.

$$\text{Light density correction value} = \frac{\text{average light density of pixels positioned outside a tunnel region}}{\text{average light density of pixels positioned inside a tunnel region}} \quad \text{[Equation 4]}$$

In addition, in case where all pixels constituting each individual object are only positioned inside the tunnel region, by using the segmentation result by the first image analyzer 210 and the segmentation result by the second image analyzer 220, the correction value calculator 340 may extract the average light density of pixels (all pixels) positioned inside the tunnel region through the average calculator 330 for the corresponding object, and extract the average light density of pixels positioned outside the tunnel region stored by the extractor 360 according to the analysis result of the previous frame. Through this, the light density correction value for the corresponding object is calculated by applying Equation 4 above.

For the pixels corresponding to the inside of the tunnel region in the objects classified by the image analysis unit 200 among the front image data generated by the basic input unit 100, the output image generation unit 400 preferably applies a correction value of light density based on the light density calculated by the light density analysis unit 300, and generates output image data with the light density inside the tunnel corrected.

Briefly, since there is no need to correct the light density outside the tunnel, the light density correction value calculated by the correction value calculator 340 is applied only to the pixels inside the tunnel with low brightness among the front image data, and output image data is generated.

In order to perform this operation, the output image generation unit 400 preferably includes a light density corrector 410, a brightness calculator 420, and an image generator 430, as illustrated in FIG. 1.

The light density corrector 410 preferably applies the light density correction value by the collection value calculator 340 only for each pixel positioned inside the tunnel region, among all pixels constituting each frame of the front image data, by using the segmentation result of the first image analyzer 210 and the segmentation result of the second image analyzer 220.

In this case, since the correction value calculator 340 calculates the light density correction value for each individual object, the light density corrector 410 does not need to perform distinguishment for each individual object and applies the light density correction value for each pixel.

For each pixel positioned inside the tunnel region among all pixels constituting each frame of the front image data, in the process of applying the light density correction value, the corrected light density value is calculated by multiplying the light density calculation value calculated through the pixel calculator 320 by the light density correction value calculated by the correction value calculator 340.

For each pixel constituting each frame of the front image data, the brightness calculator 420 preferably calculates a correction brightness value for each pixel by obtaining the difference between the current light density calculation value calculated through the pixel calculator 320 and the light density calculation value (corrected light density value) to which the light density correction value has been applied by the light density corrector 410.

The reason for this is that the driver does not only see the situation ahead 100% through output image data, but obviously, the output image data of the augmented reality HUD overlaps with the current external driving situation.

Therefore, if the corresponding region of the image is brightened only by the difference between the current external brightness and the brightness that needs to be enhanced, the brightness correction for dark regions is performed through overlap image data provided to the driver.

In consideration of this, for each of pixels constituting each frame of the front image data, the brightness calculator 420 calculates the corrected brightness value for each pixel by obtaining a difference between the calculated light density value (corrected light density value) to which the light density correction value is applied by the light density corrector and the current light density value calculated through the pixel calculator 320 as shown in Equation 5.

Corrected brightness value=(Corrected light density value−calculated current light density value)/brightness of HUD unit  [Equation 5]

In this case, since the corrected light density value is calculated only for each pixel positioned inside the tunnel region among all the pixels constituting each frame of the front image data by the light density corrector 410, the brightness calculator 420 calculate the corrected brightness value only for the corresponding pixel, that is, each pixel positioned inside the tunnel region among all pixels constituting each frame of the front image data.

In addition, the brightness calculator 420 can convert the brightness value to be output through the augmented reality HUD projector by dividing the brightness value into augmented reality HUD brightness control units as shown in Equation 5 above.

For each frame of the front image data, the image generator 430 preferably generates output image data with brightness enhanced by converting to RGB values by using the H and S values for each pixel by the converter 310 and the corrected brightness value by the brightness calculator.

Through this, the output image data with the brightness enhanced by the image generator 430 is displayed on the windshield of the vehicle through the augmented reality HUD projector, which is an operation of the augmented reality HUD but the present invention is not limited thereto.

Figure 2:
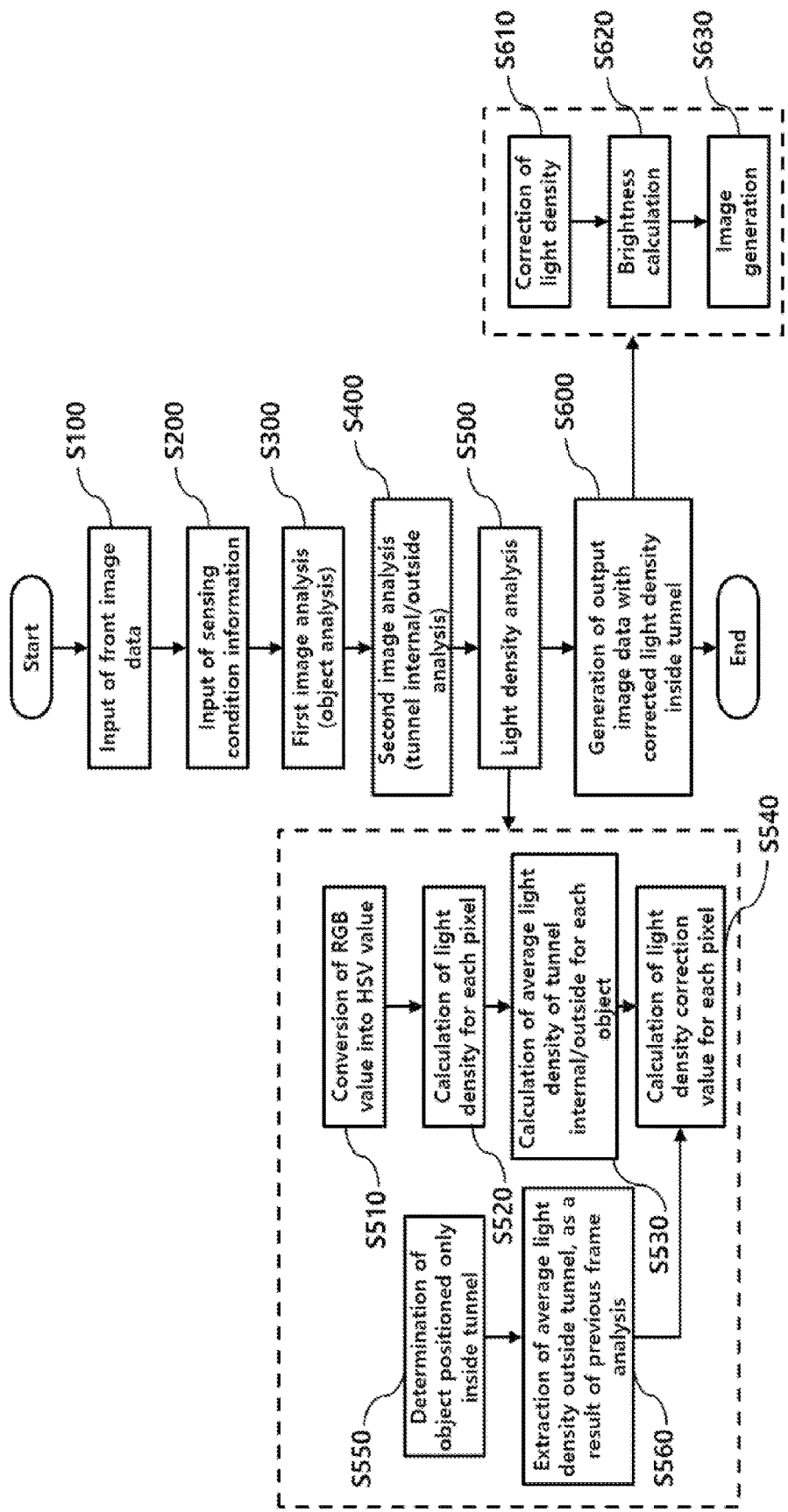
FIG. 2 is a flow diagram illustrating a method for controlling a brightness of a tunnel region of an augmented reality HUD according to an embodiment of the present invention.

FIG. 2 illustrates a flowchart of a method for controlling a brightness of a tunnel region of an augmented reality HUD.

As illustrated in FIG. 2, a method for controlling a brightness of a tunnel region of an augmented reality HUD according to an embodiment of the present invention comprises a first input step (S100), a second input step (S200), a first image analysis step (S300), a second image analysis step (S400), a light density analysis step (S500), and an output image generation step (S600). It is desirable for each step to use a system for controlling a brightness of a tunnel region of an augmented reality HUD whose operations are performed by an operation processing device.

Each step will be described in detail.

In the first input unit (S100), the basic input unit 100 receives front image data acquired from a vehicle to which an augmented reality HUD is applied.

In this case, as described above, the front image data is the front image data of the driving vehicle that is input to the augmented reality HUD to match various driving guidance information on the actual road.

In the second input step (S200), the basic input unit 100 receives sensing condition information of a sensing device that acquires the front image data in the first input step (S100) from the vehicle to which the augmented reality HUD is applied.

That is, in the second input step (S200), the front image data is received together with the sensing condition information including an aperture area and exposure time as the sensing condition when acquiring the front image data, from the sensing device that acquires the front image data.

In the second input step (S200), it is set to receive the aperture set value, exposure time, analog amplification rate, and digital amplification rate used to obtain the raw image through the embedded data area in the sensing device that acquires the front image data.

In the first image analysis step (S300), the image analysis unit 200 receives the front image data in the first input step (S100) using a stored segmentation network, segments each pixel for each frame, and classifies the segmented pixels into the units of objects.

In this case, a panoptic segmentation network is used as the stored segmentation network, but this is only an embodiment of the present invention and the present invention is not necessarily limited thereto.

Specifically, in the first image analysis step (S300), individual object areas included in the front image data are segmented into the units of pixels using the stored segmentation network.

This corresponds to the operation of a typical panoptic segmentation network.

In other words, in the panoptic segmentation network, objects that need to be divided on an object basis, that is, objects such as vehicles and people, for example, are divided into individual units in consideration of the driving environment. However, objects such as sky, tunnel, road, ground, etc. are mapped to the same object as in semantic segmentation.

In other words, when analyzing the front image data of a driving vehicle using the panoptic segmentation network, objects such as vehicle 1, vehicle 2, person 1, and person 2 are divided and segmented into individual objects. Objects such as the sky and roads are segmented into one sky object, not into sky 1 and sky 2, even if the sky is divided by large clouds.

This is because a typical panoptic segmentation network has a structure in which a sematic encoder-decoder structure and an instance encoder-decoder structure are combined, so in the first image analysis step (S300), only objects that require individual unit division are divided and segmented into individual units, and objects that do not require individual unit division are segmented into one unit.

In the second image analysis step (S400), the image analyzer 200 divides the outside and inside of the tunnel region in the objects included in the front image data in the first input step (S100), and segments them in the units of pixels, using the stored segmentation network.

As described above, in the case of a typical panoptic segmentation network, like the first image analysis step (S300), the tunnel is segmented into one object.

However, in reality, if the tunnel region is segmented, the outer structure of the tunnel itself is positioned in a region where sunlight exists, and the region inside the tunnel appears bright due to artificial lighting because sunlight does not reach the region. However, since it is realistically impossible to attach artificial lighting to all regions of the tunnel, the inside region is inevitably darker than the outside region.

Using this difference, in the second image analysis step (S400), the outer and inner regions of the tunnel region (tunnel object) in the objects included in the front image data are divided and segmented on a pixel basis.

To do this, in the second image analysis step (S400), it is preferable to add a tunnel prediction head layer that receives output through a semantic decoder in addition to the panoptic segmentation network.

Through this, learning processing is performed to classify whether the corresponding pixel exists in the region inside the tunnel.

In detail, it is desirable that the tunnel prediction layer divides pixels (pixels whose brightness values differ by more than a predetermined value. In this case, it is desirable to set a predetermined value by calculating the actual difference in brightness between the outside and inside regions of the tunnel.) within the tunnel from the image data and outputs a tunnel mask.

This is learned by giving a fixed weight to the pixels corresponding to the tunnel region in the image data including the tunnel region, and whether the tunnel is inside/outside is estimated by using the output of the sematic decoder.

In addition, by using the mask labeled with the tunnel region as a ground truth (GT), a loss value (e.g., Binary Cross Loss) is obtained, and then, a repetitive learning is performed using a stochastic gradient descent (SGD) method so that the loss value is minimized.

Through this, the front image data is image data taken before entering the tunnel, and if there is a tunnel ahead, the front image data may be determined and segmented into the pixels of the inside region and outside region of the tunnel through the second image analysis step (S400). If the image data is the image data taken after entering the tunnel, all pixels of the front image data are obviously determined and segmented to be pixels of the inside region of the tunnel.

In addition, even if there is artificial lighting inside the tunnel, since the artificial lighting is clearly different from solar energy, the inside region of the tunnel may be determined using such difference.

In the light density analysis step (S500), the light density analysis unit 300 calculates the light density for each object in the first image analysis step (S300) and the second image analysis step (S400) using the sensing condition information in the second input step (S200).

In particular, the light density analysis step (S500) includes a conversion step (S510), a pixel calculation step (S520), an average calculation step (S530), and a correction value calculation step (S540), as illustrated in FIG. 2.

In the conversion step (S510), the front image data in the first input step (S100) is transmitted, and the RGB values of each pixel is converted into HSV (Hue, Saturation, Value) values for each frame. This is a common technology, and detailed description thereof will be omitted.

In the pixel calculation step (S520), the light density of each pixel for each frame is calculated using the sensing condition information in the second input step (S200) and the V value for each pixel in the conversion step (S510).

That is, based on Equations 1 and 2 above, the light density in the direction of the corresponding pixel may be estimated from the brightness value of each pixel through Equation 3 above.

In the average calculation step (S530), the average light density of pixels positioned outside the tunnel region and the average light density of pixels positioned inside the tunnel region for each individual object are calculated by using the segmentation result in the first image analysis step (S300), the segmentation result in the second image analysis step (S400), and the calculated light density for each pixel in the pixel calculation step (S520).

That is, using the segmentation result in the second image analysis step (S400), the tunnel region classified as one object is divided into a darker inner region and a brighter outer region.

Using the classification, for each individual object (e.g., vehicle 1, vehicle 2, road, person 1, etc.), which is the segmentation result in the first image analysis step (S300), pixels are divided into pixels positioned outside the tunnel region and pixels positioned inside the tunnel region.

For example, when using the segmentation result in the first image analysis step (S300) and the segmentation result in the second image analysis step (S400), in the case of a road, if the vehicle that acquires the front image data has not entered the tunnel and there is a tunnel ahead, the object is going to be analyzed from the outside to the inside of the tunnel region obviously.

In addition, in the case of vehicle 1, if the vehicle acquires the front image data at the moment of entering the tunnel, some regions may be analyzed as if the vehicle has entered the tunnel.

Based on this, by applying the calculated light density for each pixel in the pixel calculation step (S520), the average light density for each individual object is calculated through the calculated light density values of the corresponding pixels.

If Vehicle 2 exists only outside the tunnel, it is apparent that the average light density of Vehicle 2 is calculated using all pixels positioned outside the tunnel region (all pixels constituting the objects of Vehicle 2).

In consideration of the above matters, in the average calculation step (S530), each average light density is calculated based on the outside/inside of the tunnel region because correction can be naturally performed only when each individual object has the same brightness inside the tunnel as outside the tunnel.

In summary, the average calculation step (S530) does not necessarily analyze only objects that exist simultaneously inside and outside the tunnel region, but also calculates the average light density of pixels positioned outside the tunnel region and the average light density of pixels positioned inside the tunnel region for each individual object through the front image data, with respect to all individual objects.

Depending on the current position of each object, a specific object may exist only outside the tunnel region or only inside the tunnel region, and in this case, only the average light density for the corresponding position is calculated.

In this case, if all the pixels of the object are outside the tunnel region, no additional correction for the brightness value is needed, but if all the pixels of the object are inside the tunnel region, only the average light density of the pixels positioned inside the tunnel region is calculated. Therefore, comparison between the internal brightness and the external brightness values is impossible.

In order to solve this problem, the light density analysis step (S500) further includes a determination step (S550) and an extraction step (S560), as illustrated in FIG. 2.

In the determination step (S550), the segmentation result in the first image analysis step (S300) and the segmentation result in the second image analysis step (S400) are used to determine whether all pixels constituting each individual object are positioned only inside or outside the tunnel region.

Through this, all pixels that do not necessarily require correction for brightness values can be distinguished from the objects that exist outside the tunnel region, thereby reducing the amount of computation.

According to the determination result in the determination step (S550), in case where all pixels of an object are positioned inside of the tunnel region, that is, in case where all pixels constituting a specific individual object are positioned only inside the tunnel region, in the extraction step (S560), the average light density of the pixels positioned outside the tunnel region that is stored based on the analysis results of a previous frame is extracted because the light density of the corresponding object outside the tunnel region is unknown.

To do this, in the present invention, the average light density of pixels positioned outside the tunnel region and average light density of pixels positioned inside the tunnel region of each calculated individual object for each frame, which are results in the average calculation step (S530), are stored.

In this case, it is most preferable to perform individual analysis on all frames constituting the front image data, but in reality, problems such as calculation amount and storage capacity may occur. Thus, considering the speed of the vehicle at which the front image data is acquired or the specifications of the sensing device for acquiring the front image data, it is preferable to perform analysis at regular intervals and store the analysis in a separate storage device.

In addition, because, due to driving conditions, there is a high possibility that there will be no situation in which an engine is started inside a tunnel and the first forward image data is input, in the extraction step (S560), the stored calculated average light density of pixels positioned outside the tunnel region for the corresponding specific individual object may be extracted by using the analysis result of the previous frame.

In consideration of the above matters, in the correction value calculation step (S540), the light density correction value for each pixel constituting each individual object is calculated by using the segmentation result in the first image analysis step (S300), the segmentation result in the second image analysis step (S400), and the average light density calculation value in the average calculation step (S530).

Alternatively, in the correction value calculation step (S540), the light density correction value for each pixel constituting each individual object is calculated by using the segmentation result in the first image analysis step (S300), the segmentation result in the second image analysis step (S400), the average light density calculation value in the average calculation step (S530), and the calculated average light density value in the extraction step (S560).

In detail, in case where all pixels constituting each individual object are not positioned only inside or outside the tunnel region, but are included both inside and outside the tunnel region, according to the determination result of the determination step (S550), this is the situation where the correction of the brightness value of the pixel in the dark tunnel is required using the segmentation result in the first image analysis step (S300) and the segmentation result in the second image analysis step (S400).

Therefore, in case of each individual object whose all pixels are included both inside and outside the tunnel region, in the correction value calculation step (S540), the light density correction value is preferably calculated by using the segmentation result in the first image analysis step (S300) and the segmentation result in the second image analysis step (S400), and the average light density calculation value in the average calculation step (S530).

The light density correction value is calculated for each corresponding object and is defined as in Equation 4 above.

In addition, in case where all pixels constituting each individual object are only positioned inside the tunnel region, in the correction value calculation step (S540), the average light density of pixels (all pixels) positioned inside the tunnel region may be extracted in the average calculation step (S530) for the corresponding object by using the segmentation result in the first image analysis step (S300) and the segmentation result in the second image analysis step (S400), and the average light density of pixels positioned outside the tunnel region that is stored according to the analysis result of the previous frame in the extraction step (S560) may be extracted. Through this, the light density correction value for the corresponding object is calculated by applying Equation 4 above.

In the output image generation step (S600), for only the pixels corresponding to the inside of the tunnel region in the second image analysis step (S400) among the front image data in the first input step (S100), the output image generation unit 400 preferably applies a correction value of light density based on the light density calculated in the light density analysis step (S300), and generates output image data with the light density inside the tunnel corrected.

Briefly, since there is no need to correct the light density outside the tunnel, the light density correction value calculated in the light density analysis step (S300) is applied only to the pixels inside the tunnel with low brightness among the front image data, and output image data is generated.

To do this, the output image generation step (S600) includes a light density correction step (S610), a brightness calculation step (S620), and an image generation step (S630), as illustrated in FIG. 2.

In the light density correction step (S610), the light density correction value by the correction value correction step (S540) is applied only for each pixel positioned inside the tunnel region, among all pixels constituting each frame of the front image data, by using the segmentation result in the first image analysis step (S300) and the segmentation result in the second image analysis step (S400).

In this case, since the light density correction value for each individual object is already calculated through the correction value correction step (S540), the light density correction step (S610) does not need to perform distinguishment for each individual object and applies the light density correction value for each pixel.

For each pixel positioned inside the tunnel region among all pixels constituting each frame of the front image data, in the process of applying the light density correction value, the corrected light density value is calculated by multiplying the light density calculation value calculated through the pixel calculation step (S520) by the light density correction value in the light density correction step (S610).

For each pixel constituting each frame of the front image data, in the brightness calculation step (S620), a correction brightness value for each pixel is calculated by obtaining the difference between the current light density calculation value calculated through the pixel calculation step (S520) and the light density calculation value (corrected light density value) to which the light density correction value has been applied in the light density correction step (S610).

The reason for this is that the driver does not only see the situation ahead 100% through output image data, but obviously, the output image data of the augmented reality HUD overlaps with the current external driving situation.

Therefore, if the corresponding region of the image is brightened only by the difference between the current external brightness and the brightness that needs to be enhanced, the brightness correction for dark regions is performed through overlap image data provided to the driver.

In consideration of this, for each of pixels constituting each frame of the front image data, in the brightness calculation step (S620), the corrected brightness value for each pixel is calculated by obtaining a difference between the calculated light density value (corrected light density value) to which the light density correction value is applied in the light density correction step (S610) and the current light density value calculated through the pixel calculation step (S520) as shown in Equation 5.

In this case, since the corrected light density value is already calculated only for each pixel positioned inside the tunnel region among all the pixels constituting each frame of the front image data in the light density correction step (S610), in the brightness calculation step (S620), the corrected brightness value is calculated only for the corresponding pixel, that is, each pixel positioned inside the tunnel region among all pixels constituting each frame of the front image data.

In addition, by dividing the brightness value into augmented reality HUD brightness control units as shown in Equation 5 above, a value converted into a brightness value that should be output through the augmented reality HUD projector can be obtained in the brightness calculation step (S620).

For each frame of the front image data, in the image generation step (S630), the output image data with brightness enhanced is generated by converting to RGB values by using the H and S values for each pixel in the conversion step (S510) and the corrected brightness value in the brightness calculation step (S620).

The output image data with the brightness enhanced that is generated through the image generation step (S630) is displayed on the windshield of the vehicle through the augmented reality HUD projector, which is an operation of the augmented reality HUD but the present invention is not limited thereto.

The above-described invention can be implemented in a program recorded medium as computer-readable codes. The computer-readable media may include all kinds of recording devices in which data readable by a computer system are stored. The computer-readable media may include hard disk drive (HDD), solid state disk (SSD), silicon disk drive (SDD), ROM, RAM, CD-ROM, magnetic tapes, floppy discs, light data storage devices, and the like, and also include carrier-wave type implementations (e.g., transmission via Internet). Further, the computer may also include a system for controlling a brightness of a tunnel region of an augmented reality HUD of the present invention.

According to the system and method for controlling a brightness of a tunnel region of an augmented reality HUD according to the present invention as described above, since it is impossible to resolve the dark adaptation due to the structure of the human eye, the augmented reality HUD is used to provide an output image (virtual image) so that the dark region inside the tunnel has relatively similar brightness to the bright region outside the tunnel. Therefore, since the driver looks ahead in a situation where the brightness of the driving environment outside the vehicle and the brightness of the image data output to the windshield overlap, the region inside the tunnel also has relatively similar brightness to the region outside the tunnel, which has the advantage of being able to feel the same brightness if possible.

Through this, the driver can minimally perceive or not perceive the change in brightness in front of the vehicle due to entering the tunnel, thereby eliminating limitations of field-of-vision such as dark adaptation, which has the advantage of enabling stable driving.

In addition, in case where the system and method for controlling a brightness of a tunnel region of an augmented reality HUD according to an embodiment of the present invention are legislated to be compulsorily installed in vehicles, even if the number of lights inside the tunnel that are always on is reduced or the brightness of the lights is reduced, the driver does not feel discomfort due to the dark region inside the tunnel, or the discomfort is less. Therefore, there is an advantage of achieve energy saving effects.

Although preferred embodiments of the present invention have been described above, the embodiments disclosed in the present invention are not intended to limit the technical idea of the present invention but are disclosed for illustrative. Accordingly, the technical idea of the present invention includes not only each disclosed embodiment, but also a combination of the disclosed embodiments, and furthermore, the scope of the technical idea of the present invention is not limited by these embodiments. Further, it will be apparent to those having ordinary skill in the art that various modifications and changes to the invention as described herein may be made, none of which depart from the spirit of the present invention. All such modifications and changes should therefore be seen as within the scope of the present invention.

REFERENCE NUMERALS

100: basic input unit
200: image analysis unit
210: first image analyzer
220: second image analyzer
300: light density analysis unit
310: converter
320: pixel calculator
330: average calculator
340: correction value calculator
350: determinator
360: extractor
400: output image generation unit
410: light density corrector
420: brightness calculator
430: image generator

What is claimed is:

1. A method for controlling a brightness of a tunnel region displayed by an augmented reality head-up display (HUD), comprising:
a first input step of receiving front image data obtained from a vehicle equipped with the augmented reality HUD;
a second input step of receiving, from the vehicle, sensing condition information of a sensing device that acquires the front image data in the first input step;
a first image analysis step of receiving the front image data in the first input step using a stored segmentation network and analyzing each pixel constituting each frame to segment an individual object region included into a unit of pixel;
a second image analysis step of receiving the front image data in the first input step using the stored segmentation network and analyzing each pixel constituting each frame to divide an outside and inside of the tunnel region in objects included in the front image data and segment the divided region in the unit of pixel;
a light density analysis step of calculating light density for each pixel in the first image analysis step and the second image analysis step using the sensing condition information in the second input step; and
an output image generation step of applying a correction value of the light density for a pixel corresponding to the inside of the tunnel region in the second image analysis step, among the front image data in the first input step, based on the light density calculated in the light density analysis step, and generating output image data in which the light density inside the tunnel region is corrected, wherein the output image data in the output image generation step is displayed on a windshield of the vehicle through an augmented reality HUD projector.

2. The method of claim 1, wherein the light density analysis step comprises:
a conversion step of receiving the front image data from the first input step and converting RGB values of each pixel into HSV (hue, saturation, value (brightness)) values for each frame;
a pixel calculation step of calculating the light density of each pixel for each frame using the sensing condition information in the second input step and the V value in the conversion step;
an average calculation step of calculating an average light density of a pixel positioned outside the tunnel region and an average light density of a pixel positioned inside the tunnel region for each individual object, by using a segmentation result in the first image analysis step, a segmentation result in the second image analysis step, and a light density calculation value for each pixel in the pixel calculation step; and
a correction value calculation step of calculating a light density correction value for each pixel constituting each individual object by using the segmentation result in the first image analysis step, the segmentation result in the second image analysis step, and the average light density calculation value in the average calculation step.

3. The method of claim 2, wherein the light density analysis step further comprises:
a determination step of determining whether all pixels constituting each individual object are positioned inside or outside the tunnel region, using the segmentation result in the first image analysis step and the segmentation result in the second image analysis step; and
an extraction step of extracting a calculated average light density value of the pixel positioned outside the tunnel region for a specific individual object that is stored according to an analysis result of a previous frame according to a determination result in the determination step when all of the pixels constituting the specific individual object are positioned inside the tunnel region, wherein, in the correction value calculation step, the light density correction value of each pixel for each individual object is calculated by using the segmentation result in the first image analysis step, the segmentation result in the second image analysis step, the average light density calculation value in the average calculation step, and the average light density calculation value extracted in the extraction step.

4. The method of claim 3, wherein the output image generation unit comprises:
a light density correction step of applying the light density correction value in the correction value calculation step for each pixel positioned inside the tunnel region, among all pixels constituting each frame of the front image data, by using the segmentation result in the first image analysis step and the segmentation result in the second image analysis step;
a brightness calculation step of calculating a corrected brightness value for each pixel by obtaining a difference between a current light density calculation value calculated in the pixel calculation step and the light density calculation value to which the light density correction value has been applied in the light density correction step for each pixel constituting each frame of the front image data; and
an image generation step of generating the output image data with brightness enhanced for each frame of the front image data by converting to the RGB values by using the H and S values for each pixel in the conversion step and the corrected brightness value in the brightness calculation step.

5. A system for controlling a brightness of a tunnel region displayed by an augmented reality head-up display (HUD), comprising:
a basic input unit configured to receive front image data obtained from a vehicle equipped with the augmented reality HUD and sensing condition information based on the front image data from a sensing device that acquires the front image data;
an image analysis unit configured to receive the front image data from the basic input unit using a stored segmentation network, segment each pixel constituting each frame, and classify the segmented pixel into a unit of object;
a light density analysis unit configured to calculate light density for each object by the image analysis unit using the sensing condition information by the basic input unit; and
an output image generation unit configured to apply a correction value of the light density for a pixel corresponding to an inside of the tunnel region in the object classified by the image analysis unit, among the front image data by the basic input unit, based on the light density calculated by the light density analysis unit, and generate output image data in which the light density inside the tunnel region is corrected, wherein the output image data is displayed on a windshield of the vehicle through an augmented reality HUD projector.

6. The system of claim 5, wherein the image analysis unit comprises:
a first image analyzer configured to segment an individual object region included in the front image data into a unit of pixel using the stored segmentation network; and
a second image analyzer configured to divide objects included in the front image data into an outside and inside of the tunnel region and segment the divided objects in the unit of pixel using the stored segmentation network.

7. The system of claim 6, wherein the light density analysis unit comprises:
a converter configured to receive the front image data from the basic input unit and convert RGB values of each pixel into HSV (hue, saturation, value (brightness)) values a hue (H) value, a saturation(S) value, and a value/brightness (V) value for each frame;
a pixel calculator configured to calculate the light density of each pixel for each frame using the sensing condition information from the basic input unit and the V value from the converter;
an average calculator configured to calculate an average light density of a pixel positioned outside the tunnel region and an average light density of a pixel positioned inside the tunnel region for each individual object, by using a segmentation result by the first image analyzer, a segmentation result by the second image analyzer, and a light density calculation value for each pixel by the pixel calculator; and
a correction value calculator configured to calculate a light density correction value for each pixel constituting each individual object by using a segmentation result by the first image analyzer, a segmentation result by the second image analyzer, and the average light density calculation value by the average calculator.

8. The system of claim 7, wherein the light density analysis unit further comprises:
a determinator configured to determine whether all pixels constituting each individual object are positioned inside or outside the tunnel region, using the segmentation result by the first image analyzer and the segmentation result by the second image analyzer; and
an extractor configured to extract a calculated average light density value of the pixel positioned outside the tunnel region for a specific individual object that is stored according to an analysis result of a previous frame according to a determination result of the determinator when all of the pixels constituting the specific individual object are positioned inside the tunnel region, wherein the correction value calculator are configured to calculate the light density correction value of each pixel for each individual object by using the segmentation result by the first image analyzer, the segmentation result by the second image analyzer, the average light density calculation value by the average calculator, and the average light density calculation value extracted by the extractor.

9. The system of claim 8, wherein the output image generation unit comprises:
a light density corrector configured to apply the light density correction value by the correction value calculator for each pixel positioned inside the tunnel region, among all pixels constituting each frame of the front image data, by using the segmentation result by the first image analyzer and the segmentation result by the second image analyzer;
a brightness calculator configured to calculate a corrected brightness value for each pixel by obtaining a difference between a current light density calculation value calculated by the pixel calculator and the light density calculation value to which the light density correction value has been applied by the light density corrector for each pixel constituting each frame of the front image data; and
an image generator configured to generate the output image data with brightness enhanced for each frame of the front image data by converting to the RGB values by using the H and S values for each pixel by the converter and the corrected brightness value by the brightness calculator.

* * * * *